United States Patent
He

(10) Patent No.: US 12,376,039 B2
(45) Date of Patent: Jul. 29, 2025

(54) POWER SAVING ENHANCEMENTS FOR PAGING RECEPTION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 17/455,569

(22) Filed: Nov. 18, 2021

(65) Prior Publication Data
US 2022/0225237 A1    Jul. 14, 2022

Related U.S. Application Data

(60) Provisional application No. 63/199,649, filed on Jan. 14, 2021.

(51) Int. Cl.
*H04W 52/02* (2009.01)
*H04W 68/00* (2009.01)
(Continued)

(52) U.S. Cl.
CPC ... *H04W 52/0283* (2013.01); *H04W 52/0216* (2013.01); *H04W 68/005* (2013.01); *H04W 72/0446* (2013.01); *H04W 72/23* (2023.01)

(58) Field of Classification Search
CPC ......... H04W 52/0283; H04W 52/0216; H04W 68/005; H04W 72/0446; H04W 72/23; H04W 68/025
See application file for complete search history.

(56) References Cited

U.S. PATENT DOCUMENTS

| 2019/0349856 A1* | 11/2019 | Liu | ............ H04W 52/0219 |
| 2020/0275375 A1* | 8/2020 | Liu | ............ H04W 52/0229 |

(Continued)

FOREIGN PATENT DOCUMENTS

WO    WO-2021238993 A1    12/2021

OTHER PUBLICATIONS

Huawei, et al., "Removal of Duplicate rel-15 NB-IoT/eMTC Capabilities and Introducing TDD-FDD Differentiation for WUS Capabilities in eMTC", R2-1816390, 3GPP TSG-RAN WG2 Meeting #104, 3GPP Draft, 36306_CR1625R2_(REL-15)_R2-1816390 Corrections to UE Capabilities in EMTC, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Dec. 9, 2018 (Dec. 9, 2018), XP051553648, 4 Pages, Retrieved from the Internet: URL:http://www.3gpp.org/ftp/Meetings%5F3GPP%5FSYNC/RAN/Docs/RP%2D182671%2Ezip [retrieved on Dec. 9, 2018] Sections 4.3.4.113, 4.3.4.114.

(Continued)

*Primary Examiner* — Michael K Phillips
(74) *Attorney, Agent, or Firm* — Harrity & Harrity, LLP

(57) ABSTRACT

In a wireless network, a base station may transmit a paging early indication (PEI) to a user equipment (UE) before a paging occasion (PO) to indicate whether the UE should wake up to receive a page, which is more power-efficient than legacy paging reception. However, UEs may not universally support PEI. Furthermore, a UE lacking PEI support cannot realize the potential power savings offered by a PEI. Accordingly, a UE may transmit, to a base station, capability information indicating whether the UE supports a PEI, and the base station may configure paging reception for the UE based at least in part on the capability information. In some aspects, the capability information indicates a minimum gap (Continued)

between a message scheduling a page and a message carrying the page, which allows a two-stage wake up to be implemented for UEs that support a PEI and UEs that lack PEI support.

30 Claims, 10 Drawing Sheets

(51) Int. Cl.
*H04W 72/0446* (2023.01)
*H04W 72/23* (2023.01)

(56) References Cited

U.S. PATENT DOCUMENTS

| | | | | |
|---|---|---|---|---|
| 2020/0322918 | A1* | 10/2020 | Shih | H04W 68/005 |
| 2021/0385034 | A1* | 12/2021 | Hwang | H04W 4/70 |
| 2022/0046581 | A1* | 2/2022 | He | H04L 5/0048 |
| 2023/0108646 | A1* | 4/2023 | Tseng | H04W 68/025 455/458 |
| 2023/0144750 | A1* | 5/2023 | Agiwal | H04W 48/12 455/422.1 |
| 2023/0209464 | A1* | 6/2023 | Tsai | H04L 5/0053 370/311 |
| 2024/0080696 | A1* | 3/2024 | Agiwal | H04W 72/046 |
| 2024/0080766 | A1* | 3/2024 | Zhou | H04W 52/0212 |

OTHER PUBLICATIONS

International Search Report and Written Opinion—PCT/US2022/070146—ISA/EPO—May 9, 2022.
Mediatek Inc: "UE Behaviour of WUS Monitoring", 3GPP TSG-RAN WG2 Meeting #103, R2-1811177, UE Behaviour for WUS Monitoring, 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018, Aug. 10, 2018 (Aug. 10, 2018), XP051520856, pp. 1-5, Retrieved from the Internet: URL:http://www.3gpp.org/ftp/tsg%5Fran/WG2%5FRL2/TSGR2%5F103/Docs/R2%2D1811177%2Ezip [retrieved on Aug. 10, 2018] Sections 1, 2.1, 2.2.
Mediatek Inc: "WUS Time Configuration" , 3GPP Draft, R2-1807744, 3GPP TSG-RAN WG2 Meeting #102, WUS Time Configuration—Final, 3rd Generation Partnership Project (3GPP), Mobile Competence Centre, 650, Route Des Lucioles, F-06921 Sophia-Antipolis Cedex, France, vol. RAN WG2, No. Busan, Korea, May 21, 2018-May 25, 2018, May 20, 2018 (May 20, 2018), XP051444087, pp. 1-5, Retrieved from the Internet: URL:http://www.3gpp.org/ftp/Meetings%5F3GPP%5FSYNC/RAN2/Docs/ [retrieved on May 20, 2018] Sections 1, 2.1, 2.2, 2.2.4-2.2.7, 3.
Qualcomm Inc: "Power Saving Enhancements for Paging Reception", 3GPP Draft, R2-2100313, 3GPP TSG-RAN WG2 Meeting #113-e, 3rd Generation Partnership Project (3GPP), Mobile Competence Centre, 650, Route Des Lucioles, F-06921 Sophia-Antipolis Cedex, France, vol. RAN WG2, No. Online, Jan. 25, 2021-Feb. 5, 2021, Jan. 15, 2021 (Jan. 15, 2021), XP051973505, pp. 1-4, Retrieved from the Internet: URL:https://ftp.3gpp.org/tsg_ran/WG2_RL2/TSGR2_113-e/Docs/R2-2100313.zip R2-2100313_Power saving enhancements for paging reception.docx [retrieved on Jan. 15, 2021] Sections 2.1, 2.1.1, 2.1.2, 3.

* cited by examiner

POWER SAVING ENHANCEMENTS FOR PAGING RECEPTION

CROSS-REFERENCE TO RELATED APPLICATION

This Patent Application claims priority to U.S. Provisional Patent Application No. 63/199,649, filed on Jan. 14, 2021, entitled "POWER SAVING ENHANCEMENTS FOR PAGING RECEPTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power saving enhancements for paging reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Paging is a procedure used to notify a UE in an idle or inactive mode (e.g., a radio resource control (RRC) idle or inactive mode) that the UE is to initiate a mobile-terminated call, reacquire system information, and/or receive a public warning system (PWS) notification, among other examples. For example, a base station may transmit a page (or paging message) to a UE based at least in part on an indication from a network device that is associated with a tracking area where the UE is located. Accordingly, when the UE is in an idle or inactive mode, the UE may periodically wake up during a paging occasion (PO), which refers to a specific subframe within a paging frame associated with the UE. In cases where the UE detects paging information related to the UE during the PO, the UE may decode and process the paging information (e.g., by initiating a mobile-terminated call, reacquiring system information, and/or generating an alert related to a PWS notification). Otherwise, in cases where the UE does not detect paging information related to the UE during the PO, the UE may return to the idle or inactive mode to conserve power and wake up again during the next PO. Accordingly, existing paging techniques may be power-inefficient because a UE activates an entire receive chain in order to decode a physical downlink shared channel (PDSCH) that may be carrying a paging message even though a PO may have no paging message intended for the UE.

Accordingly, in some cases, a wireless network may support a paging early indication (PEI), sometimes referred to as a wakeup signal (WUS), to improve power efficiency associated with paging reception at a UE. For example, the PEI (or WUS) is a special signal that a base station transmits to a UE before the PO associated with the UE to indicate whether the UE should wake up to receive a paging message. In this way, the UE may monitor only a physical downlink control channel (PDCCH) to determine whether the base station transmitted a PEI to indicate that the UE is to wake up to receive a paging message, and may return to a low-power state in cases where a PEI is not transmitted and/or a PEI indicates that there is no page intended for the UE in the associated PO. For example, the PEI enables the UE to wake up in two stages, which include a first stage in which the UE activates only a portion of a receive chain to monitor the PDCCH for the PEI and a second stage in which the UE activates a remaining portion of the receive chain to receive and decode the PDSCH carrying the paging message only if the PEI indicates that there is a page intended for the UE in the associated PO. However, UEs that communicate in a wireless network may not universally support a PEI before a PO. Accordingly, the base station may be unable to determine whether and/or how to configure a PEI for UEs that have different capabilities. Furthermore, in cases where a UE does not support a PEI before an associated PO, the UE may be unable to realize the potential power savings from a two-stage wake up.

Some aspects described herein relate to techniques and apparatuses to configure paging reception in a manner that may offer power savings to UEs that support a PEI and UEs that lack PEI support. For example, as described in further detail herein, a UE may transmit, to a base station, capability information that indicates whether the UE supports a PEI before a PO associated with the UE, and the base station may configure paging reception for the UE based at least in part on the capability information. For example, the base station may configure paging reception using a PEI before a PO for UEs that indicate a capability to support a PEI, and may configure paging reception using a separate paging downlink control information (DCI) to schedule a paging PDSCH for UEs that indicate an inability to support a PEI and a capability to support cross-slot scheduling. For example, in some aspects, the capability information transmitted from the UE to the base station may indicate a minimum gap between a first message scheduling a page and a second message carrying the page (e.g., a paging PDSCH). For example, the first message may be a PEI for UEs that support a PEI or a paging DCI that is sent one or more slots prior to the second message carrying the page for UEs that support cross-slot scheduling without supporting a PEI. In this way, the base station may determine an appropriate paging reception configuration based on the capabilities of a UE, and the paging reception configuration may allow a two-stage wake up to be implemented for UEs that support a PEI and for UEs that lack PEI support.

In some aspects, a method of wireless communication performed by a UE includes transmitting, to a base station, capability information that indicates whether the UE supports a PEI before a PO associated with the UE, wherein the capability information further indicates a minimum gap between a first message scheduling a page and a second message carrying the page; and monitoring, while in an inactive or idle state, a control channel for the first message based at least in part on the capability information.

In some aspects, a UE for wireless communication includes a memory and one or more processors, coupled to the memory, configured to: transmit, to a base station, capability information that indicates whether the UE supports a PEI before a PO associated with the UE, wherein the capability information further indicates a minimum gap between a first message scheduling a page and a second message carrying the page; and monitor, while in an inactive or idle state, a control channel for the first message based at least in part on the capability information.

In some aspects, a non-transitory computer-readable medium storing a set of instructions for wireless communication includes one or more instructions that, when executed by one or more processors of a UE, cause the UE to: transmit, to a base station, capability information that indicates whether the UE supports a PEI before a PO associated with the UE, wherein the capability information further indicates a minimum gap between a first message scheduling a page and a second message carrying the page; and monitor, while in an inactive or idle state, a control channel for the first message based at least in part on the capability information.

In some aspects, an apparatus for wireless communication includes means for transmitting, to a base station, capability information that indicates whether the apparatus supports a PEI before a PO associated with the apparatus, wherein the capability information further indicates a minimum gap between a first message scheduling a page and a second message carrying the page; and means for monitoring, while in an inactive or idle state, a control channel for the first message based at least in part on the capability information.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
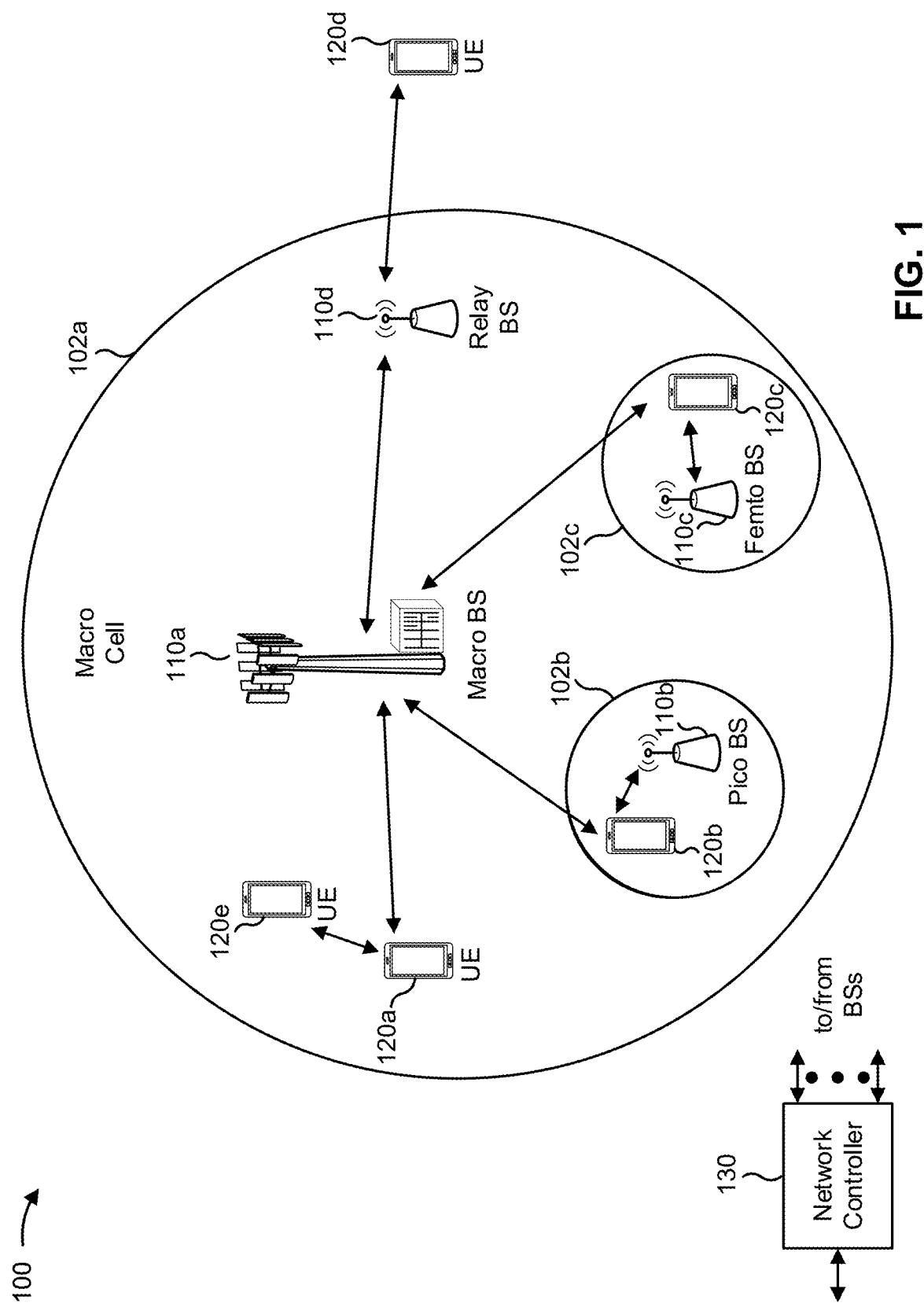
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In wireless network 100, paging procedures may be used to notify a UE 120 in an idle or inactive mode (e.g., a radio resource control (RRC) idle or inactive mode) that the UE 120 is to initiate a mobile-terminated call, reacquire system information, and/or receive a public warning system (PWS) notification. For example, a base station 110 may transmit a page (or paging message) to a UE 120 based at least in part on an indication from a network device that is associated with a tracking area where the UE 120 is located. Accordingly, when the UE 120 is in an idle or inactive mode, the UE 120 may periodically wake up during a paging occasion (PO), which refers to a specific subframe within a paging frame associated with the UE 120. In cases where the UE 120 detects paging information related to the UE 120 during the PO, the UE 120 may decode and process the paging information (e.g., by initiating a mobile-terminated call, reacquiring system information, and/or generating an alert related to a PWS notification). Otherwise, in cases where the UE 120 does not detect paging information related to the UE 120 during the PO, the UE 120 may return to the idle or inactive mode to conserve power and wake up again during the next PO. Accordingly, existing paging techniques may be power-inefficient because a UE 120 activates an entire receive chain in order to decode a physical downlink shared channel (PDSCH) that may be carrying a paging message even though a PO may have no paging message intended for the UE 120.

Accordingly, in some cases, wireless network 100 may support a paging early indication (PEI), sometimes referred to as a wakeup signal (WUS), to improve power efficiency associated with paging reception at a UE 120. For example, the PEI (or WUS) is a special signal that a base station 110 transmits to a UE 120 before the PO associated with the UE 120 to indicate whether the UE 120 should wake up to receive a paging message. In this way, the UE 120 may monitor only a physical downlink control channel (PDCCH) to determine whether the base station transmitted a PEI to indicate that the UE 120 is to wake up to receive a paging message, and may return to a low-power state in cases where a PEI is not transmitted and/or a PEI indicates that there is no page intended for the UE 120 in the associated PO. For example, the PEI enables the UE 120 to wake up in two stages, which include a first stage in which the UE 120 activates only a portion of a receive chain to monitor the PDCCH for the PEI and a second stage in which the UE 120 activates a remaining portion of the receive chain to receive and decode the PDSCH carrying the paging message only if the PEI indicates that there is a page intended for the UE 120 in the associated PO. However, UEs 120 that communicate in wireless network 100 may not universally support a PEI before a PO. Accordingly, a base station 110 may be unable to determine whether and/or how to configure a PEI for UEs 120 that have different capabilities. Furthermore, in cases where a UE 120 does not support a PEI before an associated PO, the UE 120 may be unable to realize the potential power savings from a two-stage wake up.

Some aspects described herein relate to techniques and apparatuses to configure paging reception in a manner that may offer power savings to UEs 120 that support a PEI and UEs 120 that lack PEI support. For example, as described in further detail herein, a UE 120 may transmit, to a base station 110, capability information that indicates whether the UE 120 supports a PEI before a PO associated with the UE 120, and the base station 110 may configure paging reception for the UE 120 based at least in part on the capability information. For example, the base station 110 may configure paging reception using a PEI before a PO for UEs 120 that indicate a capability to support a PEI, and may configure paging reception using a separate paging downlink control information (DCI) to schedule a paging PDSCH for UEs 120 that indicate an inability to support a PEI and a capability to support cross-slot scheduling. For example, in some aspects, the capability information transmitted from the UE 120 to the base station 110 may indicate a minimum gap between a first message scheduling a page and a second message carrying the page (e.g., a paging PDSCH). For example, the first message may be a PEI for UEs 120 that support a PEI or a paging DCI that is sent one or more slots prior to the second message carrying the page for UEs 120 that support cross-slot scheduling without supporting a PEI. In this way, the base station 110 may determine an appropriate paging reception configuration based on the UE capabilities, and the paging reception configuration may allow a two-stage wake up to be implemented for UEs 120 that support a PEI and UEs 120 that lack PEI support.

As indicated above, FIG. 1 is provided as an example. Other examples may differ from what is described with regard to FIG. 1.

Figure 2:
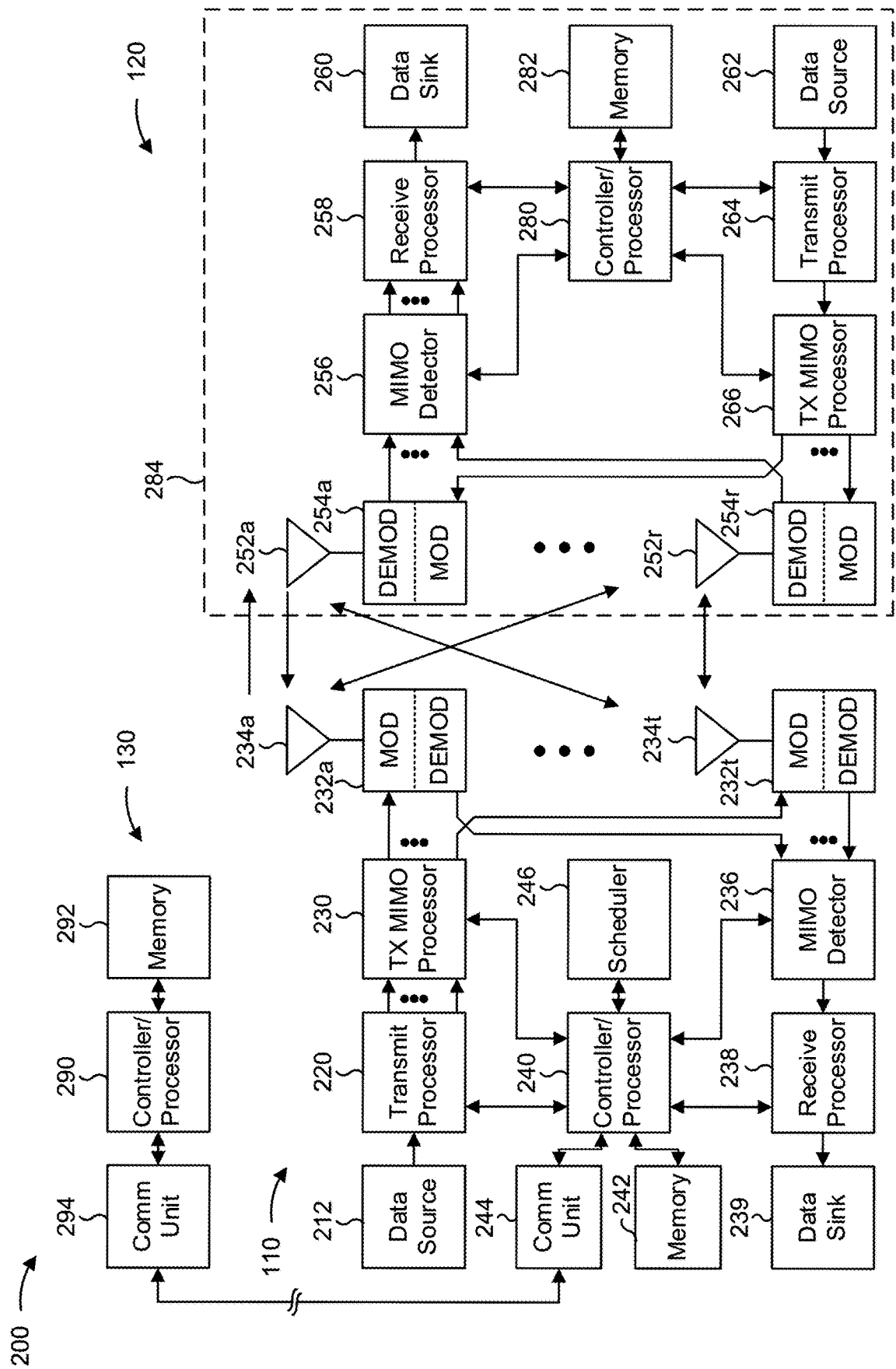
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with power saving enhancements for paging reception, as described in more detail elsewhere herein. For example, controller/processor 240 of the base station 110, controller/processor 280 of UE 120, and/or any other component(s) of FIG. 2 may perform or direct operations of, for example, method 500 of FIG. 5 and/or other methods as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 500 of FIG. 5 and/or other methods as described herein. In some aspects, executing instructions may include running the instructions, converting the instructions, compiling the instructions, and/or interpreting the instructions, among other examples.

In some aspects, the UE 120 includes means for transmitting, to the base station 110, capability information that indicates whether the UE supports a PEI before a PO associated with the UE 120, wherein the capability information further indicates a minimum gap between a first message scheduling a page and a second message carrying the page; and/or means for monitoring, while in an inactive or idle state, a control channel for the first message based at least in part on the capability information. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving the second message carrying the page based at least in part on scheduling information included in the paging DCI.

In some aspects, the UE 120 includes means for receiving, from the base station 110, information configuring a PEI occasion before each PO associated with the UE paging group based at least in part on the minimum gap indicated in the capability information.

In some aspects, the UE 120 includes means for detecting a PEI message in a PEI occasion before a PO associated with the UE paging group; and/or means for determining that at least one page is scheduled in the PO following the PEI occasion in which the PEI message is detected.

In some aspects, the UE 120 includes means for decoding the second message carrying the at least one page based at least in part on the PEI message indicating that the at least one page scheduled in the PO following the PEI occasion includes a page for one or more UEs in the UE paging group.

In some aspects, the UE 120 includes means for refraining from decoding the second message carrying the at least one page based at least in part on the PEI message indicating that the at least one page scheduled in the PO following the PEI occasion does not include a page for any UE in the UE paging group.

In some aspects, the UE 120 includes means for receiving, from the base station 110, configuration information indicating that the UE 120 is either to refrain from decoding the second message or monitor the control channel for a paging indication associated with a PO following a PEI occasion in which a condition is satisfied; and/or means for operating according to the configuration information in a PO following a PEI occasion in which the condition is satisfied.

In some aspects, the UE 120 includes means for determining that the PEI occasion is invalid based at least in part on the PEI occasion overlapping with one or more of a downlink reference signal or a radio resource management measurement window.

In some aspects, the UE 120 includes means for measuring one or more reference signals to enable reception of the second message based at least in part on detecting the first message on the control channel, wherein a configuration associated with the one or more reference signals is indicated in a system information block (SIB) other than a master information block (MIB) or a SIB that carries information to enable access to a cell provided by the base station 110.

As indicated above, FIG. 2 is provided as an example. Other examples may differ from what is described with regard to FIG. 2.

Figure 3A:
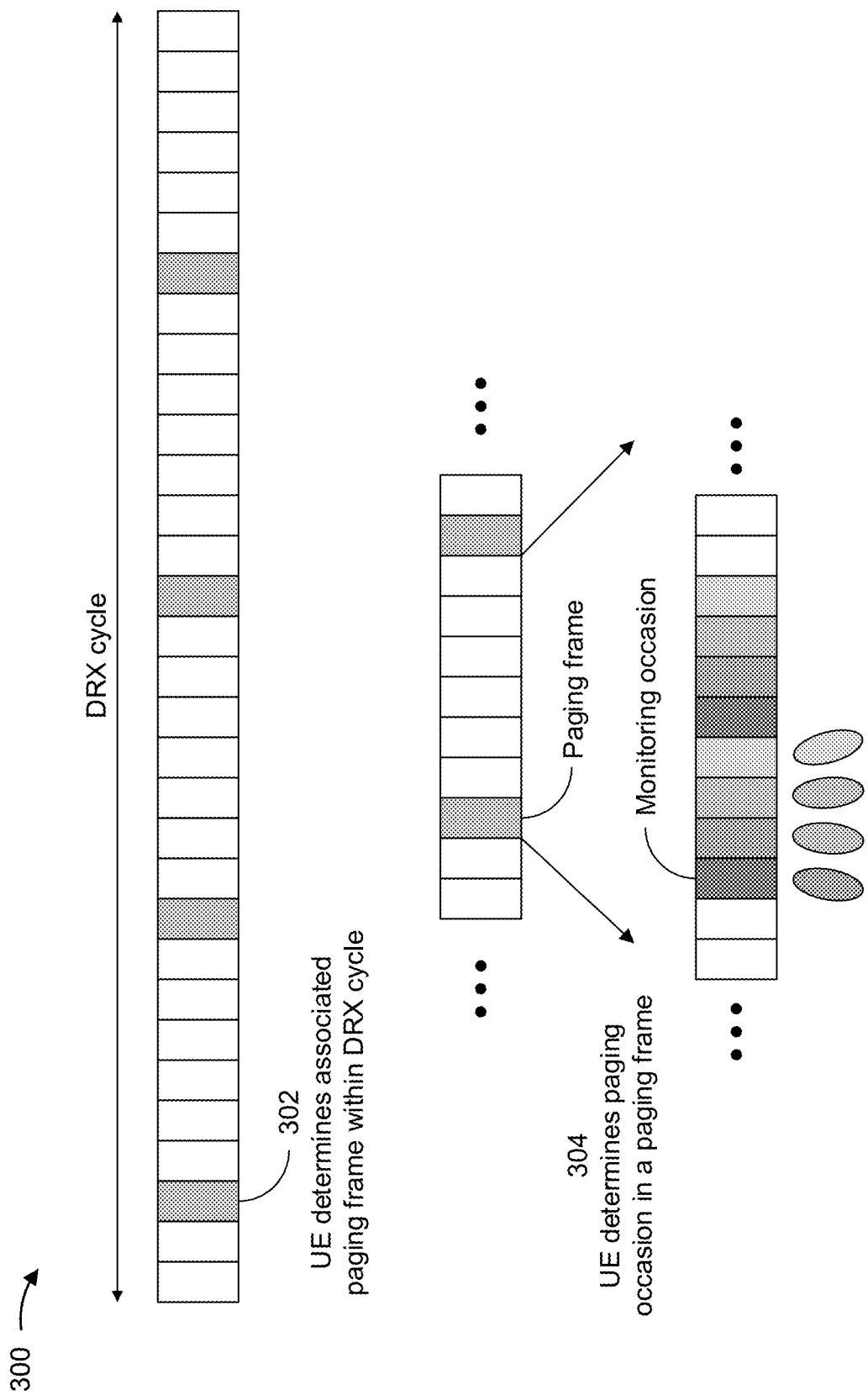
FIGS. 3A-3B are diagrams illustrating examples of paging configurations.
Figure 3B:
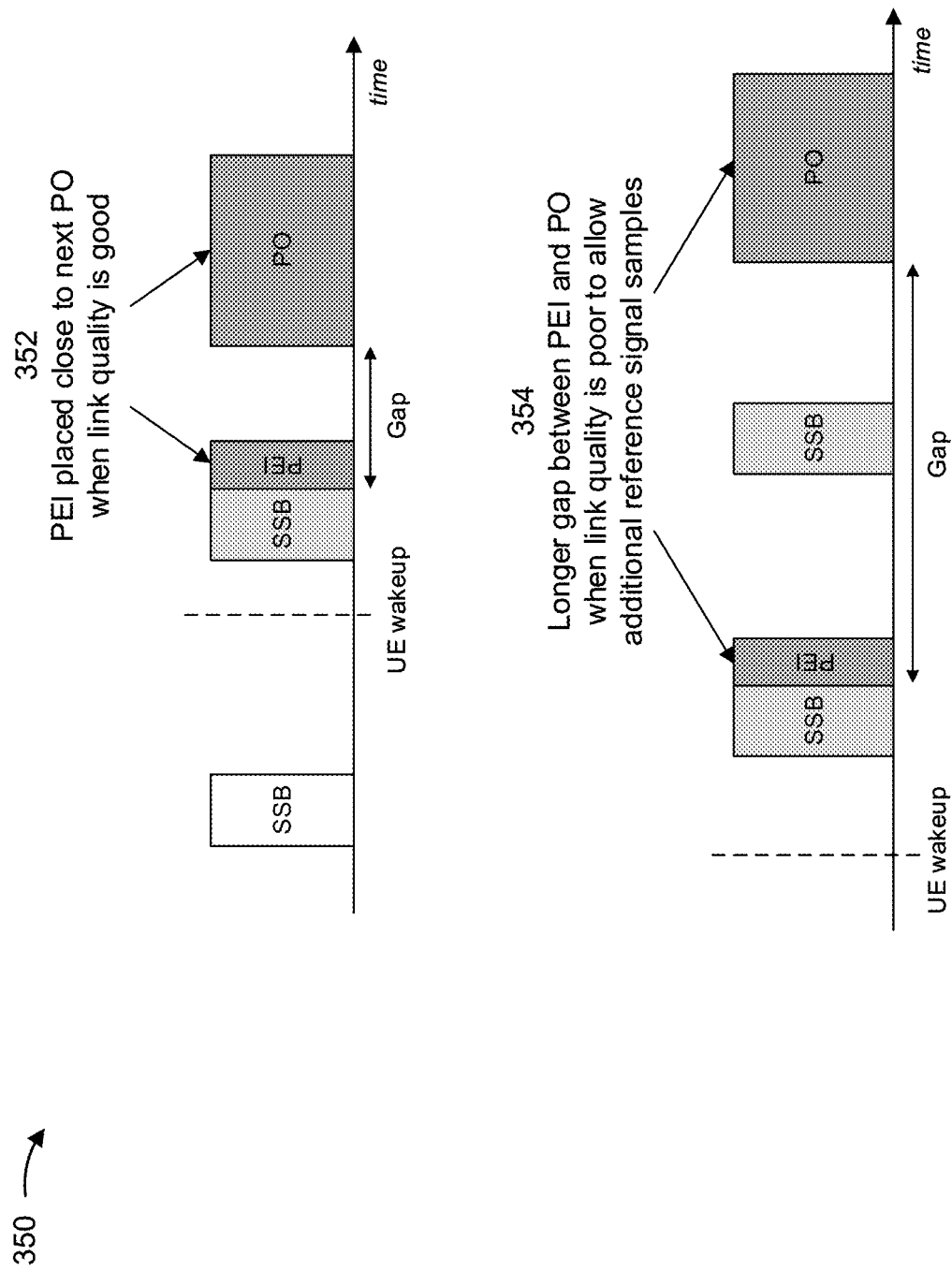

FIGS. 3A-3B are diagrams illustrating examples 300, 350 of paging configurations. For example, FIG. 3A illustrates an example 300 of a paging reception configuration in which a UE in an idle or inactive mode monitors a control channel (e.g., a PDCCH) during a PO within a paging frame configured for the UE to determine whether a page is scheduled for the UE during the PO. For example, at 302, the UE may determine a paging frame within a discontinuous reception (DRX) cycle configured for the UE. The paging frame may generally represent a reference frame or a starting frame for a PO associated with the UE, because a PO associated with a paging frame may start in the paging frame or after the paging frame due to multi-beam operation and/or PO repetition.

Accordingly, in some aspects, a base station may configure paging reception for the UE by indicating a number of radio frames in a DRX cycle, which may have a cell-specific value or a UE-specific value. In general, the DRX cycle may be configured to include 32, 64, 128, or 256 radio frames, and the base station may further configure an interval between adjacent paging frames (e.g., 1, 2, 4, 8, or 16 radio frames) and a time domain offset in frames for paging frames (e.g., from zero to N frames, where N is one less than the interval between adjacent paging frames). In some aspects, a number of paging frames in each DRX cycle may be based at least in part on the number of radio frames and the interval between adjacent paging frames. For example, in FIG. 3A, the DRX cycle includes 32 radio frames that are 10 milliseconds each, the interval between adjacent paging frames is 8 radio frames (or 80 milliseconds), and the time domain offset is 6 radio frames, resulting in four (4) paging frames in the DRX cycle. The UE may determine, among the various paging frames in the DRX cycle, the particular paging frame that is associated with the UE based on an identifier assigned to the UE.

As further shown in FIG. 3A, at 304, the UE may determine a PO in a paging frame that is associated with the UE, and the UE may monitor the control channel for a paging indication associated with the UE during the PO associated with the UE. For example, the base station may configure a number of POs per paging frame (e.g., 1, 2, or 4 POs per paging frame), and the UE may determine a PO index ($i_s$) associated with the UE based on the identifier assigned to the UE. In general, each PO may contain a set of S*X consecutive PDCCH monitoring occasions, where S is a number of actual transmitted synchronization signal blocks (SSBs) indicated in a SIB that carries information to enable access to a cell provided by the base station (e.g., SIB1) and X is a number of PDCCH monitoring occasions per SSB in a PO (e.g., 1, 2, 3, or 4). The starting PDCCH monitoring occasion number of PO $i_s$ is either configured by the base station or based on a value of $i_s$*S*X, where the [x*S+K]th PDCCH monitoring occasion for paging in the PO corresponds to the Kth transmitted SSB, where x=0, 1, . . . , X−1, K=1, 2, . . . , S.

In some aspects, when the UE is in an idle or inactive mode, the UE may wake up from the idle or inactive mode once in every DRX cycle during the PO associated with the UE, which is determined in the manner described above. At the time that the UE wakes up from the idle or inactive mode, the UE is generally unaware of whether there will be a page for the UE during the PO. Consequently, when the UE wakes up during the PO associated with the UE, an entire receive chain is activated to enable the UE to receive and decode a page that may be carried on a PDSCH. This may increase power consumption at the UE, as components needed to receive and decode the paging PDSCH may not need to be activated if there is no page scheduled for the UE.

Accordingly, in some cases, a wireless network may support a paging early indication (PEI), sometimes referred to as a wakeup signal (WUS), to improve power efficiency associated with paging reception at a UE. For example, as shown in FIG. 3B, the PEI (or WUS) is a special signal that a base station transmits to a UE before the PO associated with the UE to indicate whether the UE should wake up to receive a paging message. In this way, the UE may monitor only a PDCCH to determine whether the base station transmitted a PEI to indicate that the UE is to wake up to receive a paging message, and may return to a low-power state in cases where a PEI is not transmitted and/or a PEI indicates that there is no page intended for the UE in the associated PO. Alternatively, when the PEI is transmitted to indicate that the UE should wake up to receive a paging message, the UE may fully wake up to receive the PDSCH carrying the paging message. In such cases, after the UE receives a PEI indicating that the UE has a page, the UE may additionally measure one or more reference signals (e.g., one or more SSBs, tracking reference signals (TRSs), and/or channel state information reference signals (CSI-RSs)) to synchronize with the base station and improve decoding of the PDSCH carrying the paging message. For example, as shown at 352, the PEI may be placed relatively close to the next PO in cases where the channel between the base station and the UE has a good link quality, as remaining time after the UE processes the reference signal transmissions may not be long enough to merit a transition to deep sleep (e.g., one reference signal sample may be enough to reliably decode the paging PDSCH). Otherwise, as shown at 354, a longer gap may be provided between the PEI and the next PO to allow the UE to obtain multiple reference signal samples between the PEI and the next PO when the quality of the channel between the base station and the UE is poor.

In this way, the PEI enables the UE to wake up in two stages, which include a first stage in which the UE activates only a portion of a receive chain to monitor the PDCCH for the PEI and a second stage in which the UE activates a remaining portion of the receive chain to receive and decode the paging PDSCH (and/or measure or sample reference signals) if the PEI indicates that there is a page for the UE in the associated PO. However, UEs that communicate in a wireless network may not universally support a PEI before a PO. Accordingly, the base station may be unable to determine whether and/or how to configure a PEI for UEs that have different capabilities. Furthermore, in cases where a UE does not support a PEI before an associated PO, the UE may be unable to realize the potential power savings from a two-stage wake up. Accordingly, some aspects described herein relate to techniques and apparatuses to configure paging reception in a manner that may offer power savings to UEs that support a PEI and UEs that lack PEI support. For example, as described in further detail below with reference to FIGS. 4A-4C, a UE may transmit, to a base station, capability information that indicates whether the UE supports a PEI before a PO associated with the UE, and the base station may configure paging reception for the UE based at least in part on the capability information. For example, the base station may configure paging reception using a PEI before a PO for UEs that indicate a capability to support a PEI, and may configure paging reception using a separate paging downlink control information (DCI) to schedule a paging PDSCH for UEs that indicate an inability to support a PEI and a capability to support cross-slot scheduling. For example, in some aspects, the capability information transmitted from the UE to the base station may indicate a minimum gap between a first message scheduling a page and a second message carrying the page (e.g., a paging PDSCH). For example, the first message may be a PEI for UEs that support a PEI or a paging DCI that is sent one or more slots prior to the second message carrying the page for UEs that support cross-slot scheduling without supporting a PEI. In this way, the base station may determine an appropriate paging reception configuration based on the capabilities of a UE, and the paging reception configuration may allow a two-stage wake up to be implemented for UEs that support a PEI and for UEs that lack PEI support.

As indicated above, FIGS. 3A-3B are provided as an example. Other examples may differ from what is described with regard to FIGS. 3A-3B.

Figure 4A:
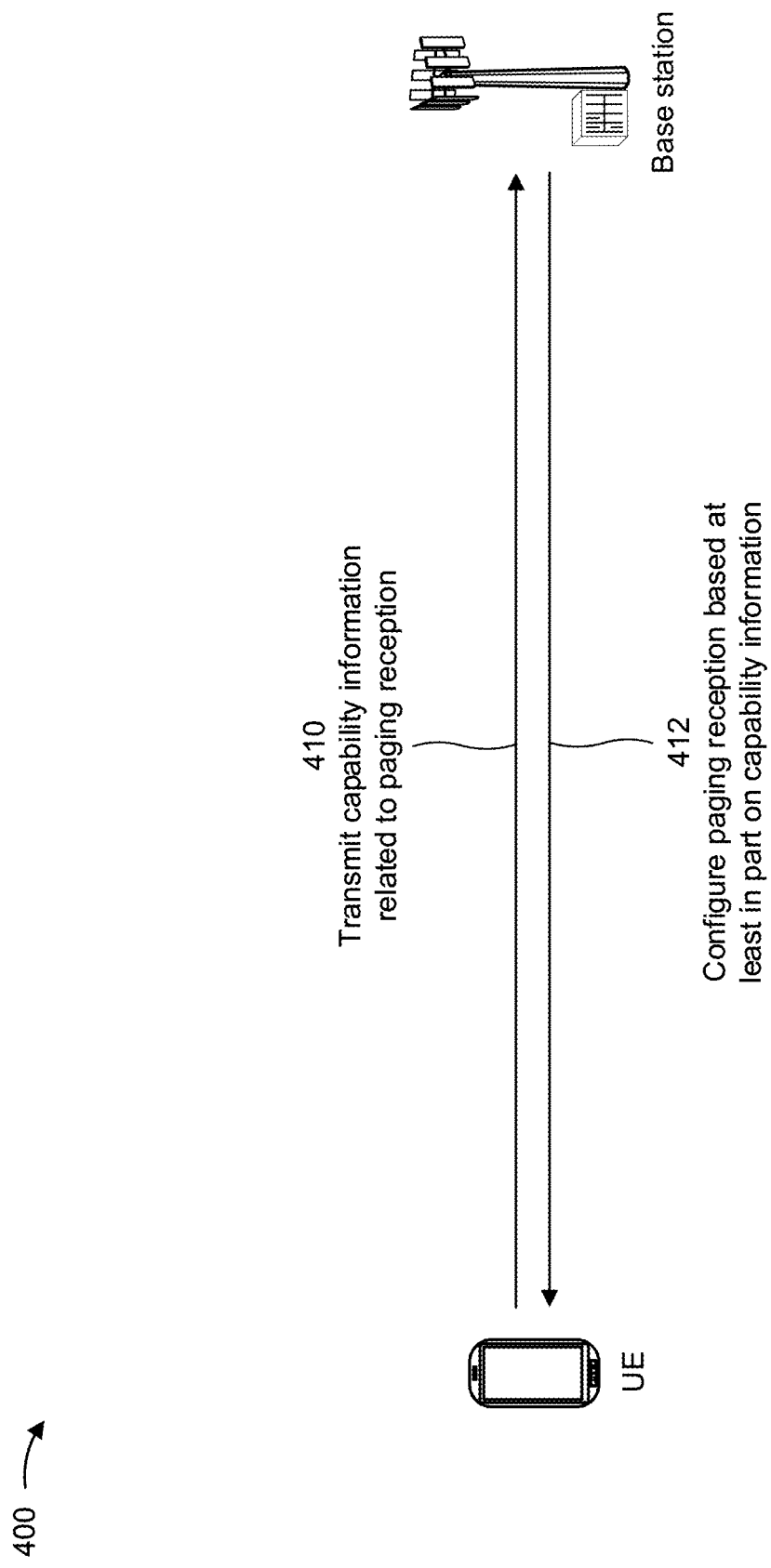
FIGS. 4A-4C are diagrams illustrating examples associated with power saving enhancements for paging reception.
Figure 4B:
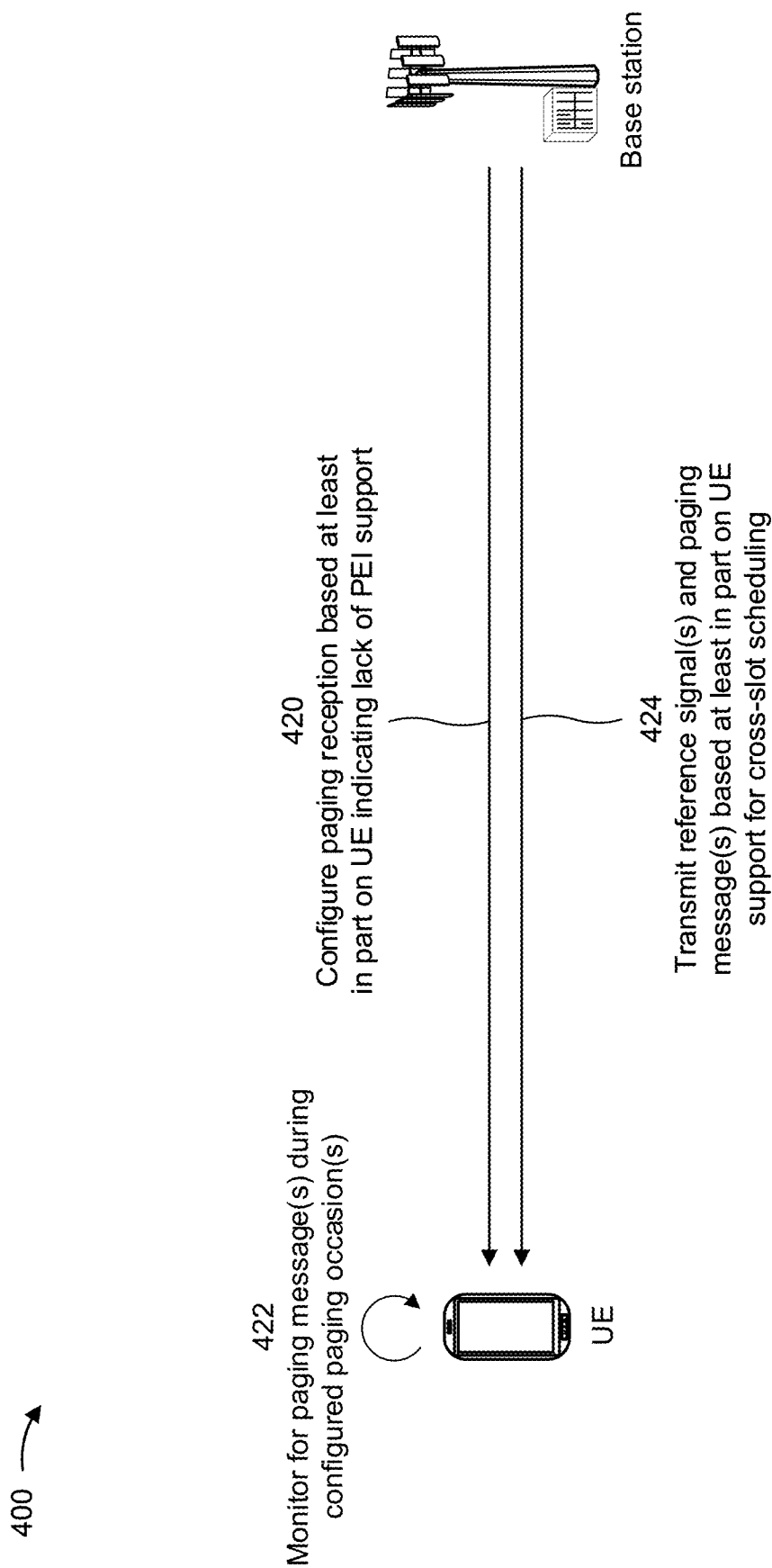
Figure 4C:
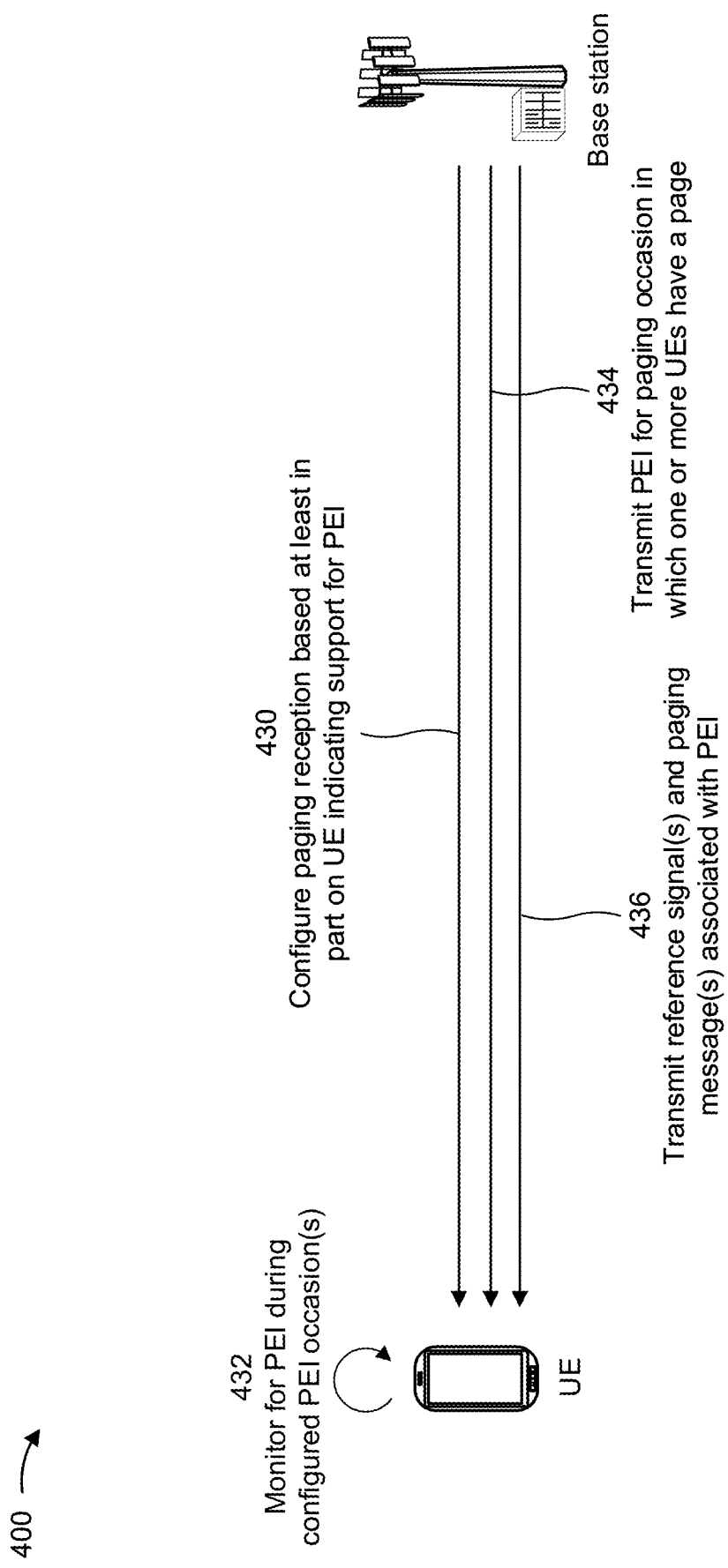

FIGS. 4A-4C are diagrams illustrating examples 400 associated with power saving enhancements for paging reception. As shown in FIGS. 4A-4C, examples 400 include communication between a base station (e.g., base station 110) and a UE (e.g., UE 120). In some aspects, the base station and the UE may be included in a wireless network, such as wireless network 100. The base station and the UE may communicate via a wireless access link, which may include an uplink and a downlink.

As shown in FIG. 4A, at 410, the UE may transmit capability information related to paging reception to the base station. For example, in some aspects, the capability information may indicate whether the UE supports a paging reception configuration in which a PEI is transmitted prior to a PO associated with the UE to indicate whether the UE is to wake up to receive a page during the PO. Furthermore, the capability information may indicate a minimum gap that the UE supports between a first message scheduling a page and a second message carrying the page. For example, in cases where the UE supports a paging reception configuration based on a PEI, the capability information may indicate a minimum gap that the UE supports between a PEI occasion configured for the UE and a paging PDSCH occasion following the PEI occasion (e.g., based on a number of SSB measurements and/or other reference signal measurements that the UE needs to reliably decode the PDSCH that carries the paging message for the UE).

Alternatively, in cases where the UE does not support a paging reception configuration in which a PEI is transmitted prior to a PO associated with the UE, the UE may nonetheless realize the same or similar power saving advantages if the UE supports cross-slot scheduling. For example, in a cross-slot scheduling configuration, the UE may receive a paging DCI message that schedules a paging PDSCH in a first slot, and the paging DCI may schedule the paging PDSCH in a second slot. In this case, the UE may implement a two-stage wakeup if a gap with a sufficient width is configured between the paging DCI and the paging PDSCH (e.g., the UE may consume less power to monitor for the paging DCI compared to regular PDCCH monitoring, and may save additional power by skipping the paging PDSCH if there is no paging message for the UE). Accordingly, because the UE may be able to achieve power savings that are comparable to a PEI configuration using cross-slot scheduling, the capability information transmitted to the base station may indicate a minimum k0 that defines a minimum number of slots that the UE supports between the paging DCI and the paging PDSCH such that the base station can schedule the UE according to the minimum k0 supported by the UE.

As further shown in FIG. 4A, at 412, the base station may transmit, and the UE may receive, information configuring paging reception at the UE based at least in part on the capability information indicated by the UE. For example, as described in further detail below with reference to FIG. 4B, the base station may configure paging reception for the UE in cases where the UE indicates a lack of PEI support. Alternatively, as described in further detail below with reference to FIG. 4C, the base station may configure paging reception for the UE in cases where the UE indicates that PEI is supported.

For example, FIG. 4B illustrates communication between the base station and the UE that may occur in cases where the UE indicates that PEI is not supported. As shown at 420, the base station may transmit, to the UE, information configuring paging reception at the UE based at least in part on the UE indicating a lack of PEI support. Furthermore, the information configuring the paging reception may depend on whether the capability information signaled by the UE indicates that the UE supports cross-slot scheduling (e.g., where a paging DCI is received in a first slot to schedule a paging PDSCH in a second slot). For example, in some aspects, the base station may configure an exclusive set of POs for UEs that do not support cross-slot scheduling, which may be referred to herein as type-A UEs, and the base station may configure a separate exclusive set of POs for UEs that do support cross-slot scheduling, which may be referred to herein as type-B UEs. Accordingly, in cases where the UE indicates a lack of PEI support and a lack of support for cross-slot scheduling (e.g., the UE is a type-A UE), the paging reception configuration information may indicate that the UE is to use the exclusive set of POs for type-A UEs to monitor a PDCCH for a paging indication for the UE (e.g., in a similar manner as described above with reference to FIG. 3A). Alternatively, in cases where the UE indicates a lack of PEI support and support for cross-slot scheduling (e.g., the UE is a type-B UE), the paging reception configuration information may indicate that the UE is to monitor for a separate paging DCI to schedule a paging PDSCH in the exclusive set of POs for type-B UEs (e.g., based on the minimum k0 signaled by the UE). Alternatively, rather than configuring separate sets of POs for type-A UEs and type-B UEs, the base station may configure a single set of POs to be shared by type-A UEs and type-B UEs (e.g., to maximize resource utilization of the paging channel).

Additionally, or alternatively, the information configuring paging reception at the UE may indicate that the base station can support two UE paging groups, which may include a first UE paging group including UEs that lack support for cross-slot scheduling (e.g., type-A UEs) and a second UE paging group including UEs that support cross-slot scheduling (e.g., type-B UEs). In this case, the first UE paging group and the second UE paging group may share the same POs, and when the base station transmits a page indication (e.g., as described below), the base station may signal whether the page is intended for the first UE paging group or the second UE paging group. For example, in some aspects, the base station may signal whether the page is intended for the first UE paging group or the second UE paging group using a field in paging DCI. Additionally, or alternatively, the base station may assign a first radio network temporary identifier (RNTI) (e.g., a first paging RNTI (P-RNTI)) to the first UE paging group and a second RNTI (e.g., a second P-RNTI) to the second UE paging group. In this case, when transmitting a paging DCI, the base station may scramble the paging DCI with the RNTI assigned to the UE paging group that is intended to receive the page.

Furthermore, in some aspects, the information configuring paging reception for the UE may include configuration information associated with a TRS, a CSI-RS, and/or other suitable reference signals that the UE may measure in order to increase reliability of decoding a paging PDSCH. For example, the TRS or CSI-RS configuration may be relatively static so that UEs in an idle or inactive mode do not need to frequently update the configuration information for the TRS or CSI-RS. In addition, there is no strong latency requirement for the UE to obtain the configuration information for the TRS or CSI-RS. On the other hand, space in a master information block (MIB) or other system information block (SIB) that carries information to enable access to a cell provided by the base station may be reserved for configurations that are most critical to UE access. Accordingly, in some aspects, the configuration information for the TRS or CSI-RS may be signaled in a SIB other than a MIB or a SIB that carries information to enable access to a cell provided by the base station (e.g., SIB1). For example, because the purpose of the TRS and CSI-RS configuration is to enable the UE to measure reference signals for a paging procedure while in an idle or inactive mode, the SIB used to indicate the configuration for the TRS or CSI-RS may be SIB11, which is used to signal measurement configurations for UEs in an RRC idle or inactive mode. Furthermore, because the TRS or CSI-RS configuration is signaled to the UE in the idle or inactive mode to improve efficiency in the usage of network resources, the TRS or CSI-RS configuration may be provided in signaling that is addressed to multiple UEs (e.g., broadcast signaling rather than dedicated signaling).

As further shown in FIG. 4B, at 422, the UE may monitor for a paging message addressed to the UE during the POs configured for the UE (e.g., depending on whether the UE is a type-A UE, the UE is a type-B UE, or the base station configures a set of POs to be shared by type-A and type-B UEs). For example, if the UE is a type-A UE that lacks support for a PEI and lacks support for cross-slot scheduling, the UE may monitor a PDCCH for a paging indication for the UE in the POs configured for the UE. Alternatively, if the UE is a type-B UE that lacks support for a PEI but supports cross-slot scheduling, the UE may monitor for a paging DCI that is used to schedule a paging PDSCH in a subsequent slot.

As further shown in FIG. 4B, at 424, the base station may transmit one or more reference signals and/or one or more paging messages based at least in part on whether the UE supports cross-slot scheduling (e.g., the information transmitted to the UE may be configured based on whether the paging messages are to be received by type-A UEs only, type-B UEs only, or type-A and type-B UEs). For example, in some aspects, the one or more reference signals may be transmitted based on the configuration information indicated in the SIB to enable the UE to reliably decode a paging PDSCH. Furthermore, in cases where different exclusive sets of POs are configured for type-A UEs and type-B UEs, the paging messages may be configured accordingly. However, in cases where a shared set of POs are configured for type-A UEs and type-B UEs, the paging DCI that is used for type-B UEs may include an additional indication to enable the type-B UEs to obtain the paging PDSCH scheduled by the paging DCI and/or indicate that the type-B UEs can skip the paging PDSCH occasion. For example, if only type-A UEs have pages in a particular PO, the indication may not be set in the paging DCI, whereby type-B UEs can skip the paging PDSCH occasion because there are no pages for type-B UEs. Alternatively, if only type-B UEs have pages in a particular PO, the indication in the paging DCI may be set to indicate that type-B UEs are to use scheduling information included in the paging DCI received in the current PO to receive the paging PDSCH. Alternatively, if both type-A UEs and type-B UEs have pages in a particular PO, the indication in the paging DCI may indicate that type-B UEs are to obtain the paging PDSCH in the first PO that is at least K slots after the current PO, where K is a maximum value among all of the minimum k0 values supported by the type-B UEs that have pages in the current PO.

Furthermore, in cases where a paging DCI is used for a UE supporting cross-slot scheduling, the paging DCI may explicitly and dynamically signal whether a TRS or CSI-RS is available. For example, in some aspects, the base station may not always transmit the TRS or CSI-RS even when configuration information for the TRS or CSI-RS is signaled to the UE (e.g., when there is no UE in RRC connected mode). In such cases, the base station may signal that no TRS or CSI-RS is available such that the UE may refrain from performing a power-expensive blind decoding process in a TRS or CSI-RS occasion when no TRS or CSI-RS is transmitted. In this way, the availability (or unavailability) of the TRS or CSI-RS may be signaled in the paging DCI prior to the PO in which the paging PDSCH is scheduled, which may allow the UE to determine whether to measure the reference signal(s) or refrain from measuring the reference signal(s) prior to attempting to decode a page.

Alternatively, according to some aspects, FIG. 4C illustrates communication that may occur between the base station and the UE in cases where the UE indicates that PEI is supported. As shown at 430, the base station may transmit, to the UE, information configuring paging reception at the UE based at least in part on the UE indicating support for PEI. In general, as described above, the PEI is transmitted at a location before a PO to indicate whether a UE associated with the PEI is to wake up to receive a page. Accordingly, because the purpose of the PEI is to indicate whether a UE has a page in a PO, each PO may have an associated PEI occasion at a location prior to the PO. Accordingly, in some aspects, the configuration information signaled to the UE may indicate the PEI occasion associated with the PO configured for the UE. Furthermore, because the PEI is shared between a group of UEs, the PEI may be scrambled by a group common RNTI, such as a P-RNTI.

Furthermore, in some aspects, the information configuring paging reception for the UE that supports PEI may include configuration information associated with a TRS, a CSI-RS, and/or other suitable reference signals that the UE may measure in order to increase reliability of decoding a paging PDSCH. For example, as described above, the configuration information for the TRS or CSI-RS may be signaled in a SIB other than a MIB or a SIB that carries information to enable access to a cell provided by the base station. For example, the SIB used to indicate the configuration for the TRS or CSI-RS may be SIB11, which is used to signal measurement configurations for UEs in an RRC idle or inactive mode. Furthermore, as described above, the TRS or CSI-RS configuration may be provided in signaling that is addressed to multiple UEs (e.g., broadcast signaling rather than dedicated signaling) in order to maximize a number of UEs that receive the TRS or CSI-RS configuration information.

In some aspects, the base station may further configure behavior of the UE when one or more conditions are satisfied (e.g., where the UE fails to detect or decode a PEI in a PEI occasion or a PEI occasion is determined to be invalid). For example, in some aspects, the base station may transmit system information to indicate that a UE is either to refrain from decoding a paging message or stay awake to monitor a control channel for a paging indication for the UE in cases where the UE fails to detect or decode a PEI or a PEI occasion is invalid (e.g., due to a collision with a downlink reference signal or radio resource management (RRM) measurement window). In the latter case, where the UE is to stay awake to monitor a control channel for a paging indication for the UE, the base station may transmit a paging DCI to the UE if the UE has a page, and the UE may be expected to monitor a PDCCH for a paging DCI in the PO associated with the UE.

As further shown in FIG. 4C, at 432, the UE may monitor for a PEI in the PEI occasion configured for the UE. For example, the UE may monitor a control channel for a PEI that is scrambled by a group common RNTI (e.g., a P-RNTI) during the PEI occasion that is at a configured location prior to the PO associated with the UE.

As further shown in FIG. 4C, at 434, the base station may transmit a PEI prior to a PO in which one or more UEs have a page. For example, in cases where any UE in a UE group has a page, the base station may transmit the PEI to indicate that one or more UEs in the UE group have a page. In addition, in cases where the PEI is transmitted, the PEI may include scheduling information for the PDSCH carrying the page. Additionally, or alternatively, if the PO following the PEI is associated with one or more UE groups in which no UE has a page, the PEI that is transmitted in the PEI occasion prior to the PO may indicate that there is no page for the one or more UE groups in the PO following the PEI. Alternatively, in cases where no UE has a page in a particular PO, the base station may refrain from transmitting the PEI in the PEI occasion prior to the particular PO. Furthermore, in cases where the base station transmits a PEI, the PEI may explicitly and dynamically signal whether a TRS or CSI-RS is available. For example, as described above, the base station may not always transmit the TRS or CSI-RS even when configuration information for the TRS or CSI-RS is signaled to the UE (e.g., when there is no UE in RRC connected mode). In such cases, the PEI may signal that no TRS or CSI-RS is available such that the UE may refrain from performing a power-expensive blind decoding process in a TRS or CSI-RS occasion when no TRS or CSI-RS is transmitted. In this way, the availability (or unavailability) of the TRS or CSI-RS may be signaled in the PEI prior to the PO in which the paging PDSCH is scheduled, which may allow the UE to determine whether to measure the reference signal(s) or refrain from measuring the reference signal(s) prior to attempting to decode a page.

As further shown in FIG. 4C, at 436, the base station may transmit one or more reference signals and/or one or more paging messages associated with the PEI. For example, as described above, the reference signals may include an SSB, a TRS, and/or a CSI-RS, among other examples, which the UE may measure to improve decoding reliability when a PEI indicates that there is a page for the UE. Accordingly, if the UE successfully decodes a PEI in a PEI occasion and the PEI indicates that there is a page for a UE group to which the UE belongs, the UE may then decode the PDSCH paging message at the location indicated by the PEI (e.g., the PO following the PEI occasion). Alternatively, if the PEI indicates that there is no page for the UE, the UE may return to a sleep (e.g., idle or inactive) state to conserve power. Alternatively, if the UE determines that one or more conditions are satisfied (e.g., the UE fails to detect or decode a PEI or a PEI occasion is deemed invalid due to a collision with a downlink reference signal or an RRM measurement window), further behavior of the UE may depend on the configuration information signaled in system information. For example, the UE may be configured to refrain from decoding the paging message if the UE fails to detect or decode a PEI or a PEI occasion is deemed invalid. Alternatively, in cases where the UE is configured to monitor a PDCCH for a paging indication when the UE fails to detect or decode a PEI or a PEI occasion is deemed invalid, the base station may transmit a paging DCI to the UE if the UE has a page, and the UE may monitor the PDCCH for a paging DCI in the PO associated with the UE.

As indicated above, FIGS. 4A-4C are provided as an example. Other examples may differ from what is described with regard to FIGS. 4A-4C.

Figure 5:
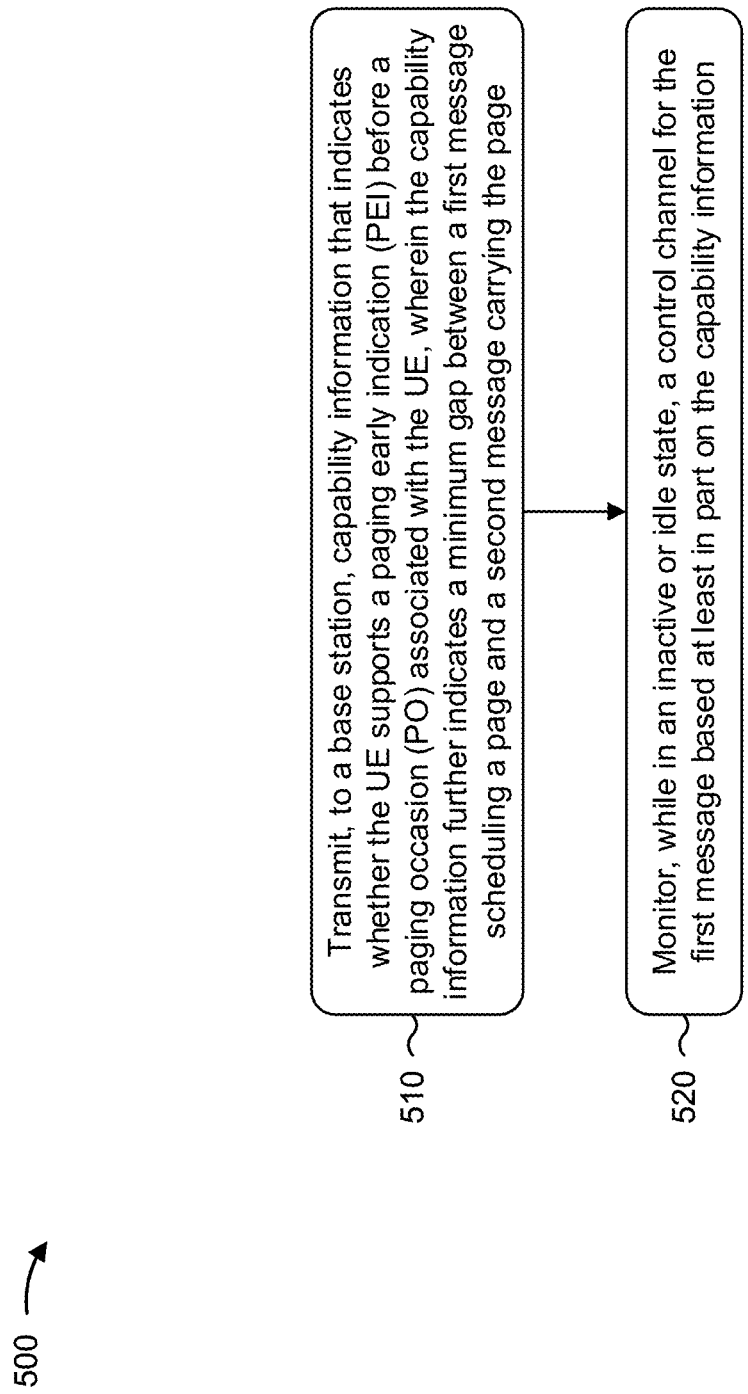
FIG. 5 is a flowchart of an example method of wireless communication.

FIG. 5 is a flowchart of an example method 500 of wireless communication. The method 500 may be performed by, for example, a UE (e.g., UE 120).

At 510, the UE may transmit, to a base station, capability information that indicates whether the UE supports a PEI before a PO associated with the UE, wherein the capability information further indicates a minimum gap between a first message scheduling a page and a second message carrying the page. For example, the UE (e.g., using transmission component 604, depicted in FIG. 6) may transmit, to a base station, capability information that indicates whether the UE supports a PEI before a PO associated with the UE, wherein the capability information further indicates a minimum gap between a first message scheduling a page and a second message carrying the page, as described above in connection with, for example, FIG. 4A at 410. In some aspects, the minimum gap includes a minimum k0 that indicates a minimum offset between a first slot in which a paging DCI message is received and a second slot in which the second message carrying the page is scheduled. In some aspects, the first message includes a PEI message shared by a UE paging group that includes the UE based at least in part on the capability information indicating that the UE supports the PEI before the PO associated with the UE. In some aspects, the PEI message is scrambled by a group-common radio network temporary identity.

At 520, the UE may monitor, while in an inactive or idle state, a control channel for the first message based at least in part on the capability information. For example, the UE (e.g., using monitoring component 608, depicted in FIG. 6) may monitor, while in an inactive or idle state, a control channel for the first message based at least in part on the capability information, as described above in connection with, for example, FIG. 4B at 422 and FIG. 4C at 432. In some aspects, the first message includes a paging DCI message based at least in part on the capability information indicating that the UE does not support the PEI before the PO associated with the UE.

In some aspects, method 500 includes receiving the second message carrying the page based at least in part on scheduling information included in the paging DCI. In some aspects, the scheduling information included in the paging DCI indicates that the second message carrying the page is scheduled in a first PO that is at least a number of slots after a PO associated with the paging DCI. In some aspects, the number of slots is a maximum value among one or more minimum k0 values supported by a set of UEs that have pages scheduled in the PO associated with the paging DCI.

In some aspects, method 500 includes receiving, from the base station, information configuring a PEI occasion before each PO associated with the UE paging group based at least in part on the minimum gap indicated in the capability information. In some aspects, method 500 includes detecting a PEI message in a PEI occasion before a PO associated with the UE paging group and determining that at least one page is scheduled in the PO following the PEI occasion in which the PEI message is detected. In some aspects, the PEI message indicates whether the at least one page scheduled in the PO following the PEI occasion includes a page for one or more UEs in the UE paging group. In some aspects, the PEI message includes scheduling information for the second message carrying the at least one page based at least in part on the PEI message indicating that the at least one page scheduled in the PO following the PEI occasion includes a page for one or more UEs in the UE paging group.

In some aspects, method 500 includes decoding the second message carrying the at least one page based at least in part on the PEI message indicating that the at least one page scheduled in the PO following the PEI occasion includes a page for one or more UEs in the UE paging group. In some aspects, method 500 includes refraining from decoding the second message carrying the at least one page based at least in part on the PEI message indicating that the at least one page scheduled in the PO following the PEI occasion does not include a page for any UE in the UE paging group. In some aspects, method 500 includes receiving, from the base station, configuration information indicating that the UE is either to refrain from decoding the second message or monitor the control channel for a paging indication associated with a PO following a PEI occasion in which a condition is satisfied, and operating according to the configuration information in a PO following a PEI occasion in which the condition is satisfied. In some aspects, the condition includes one or more of a failure to detect a PEI message in the PEI occasion, a failure to decode a PEI message in the PEI occasion, or a determination that the PEI occasion is invalid. In some aspects, method 500 includes determining that the PEI occasion is invalid based at least in part on the PEI occasion overlapping with one or more of a downlink reference signal or a radio resource management measurement window.

In some aspects, method 500 includes measuring one or more reference signals to enable reception of the second message based at least in part on detecting the first message on the control channel, wherein a configuration associated with the one or more reference signals is indicated in a SIB other than a MIB or a SIB that carries information to enable access to a cell provided by the base station. In some aspects, the SIB indicating the configuration associated with the one or more reference signals is addressed to multiple UEs. In some aspects, the first message indicates availability of the one or more reference signals based at least in part on the capability information.

Although FIG. 5 shows example blocks of method 500, in some aspects, method 500 may include additional blocks, fewer blocks, different blocks, or differently arranged blocks than those depicted in FIG. 5. Additionally, or alternatively, two or more of the blocks of method 500 may be performed in parallel.

Figure 6:
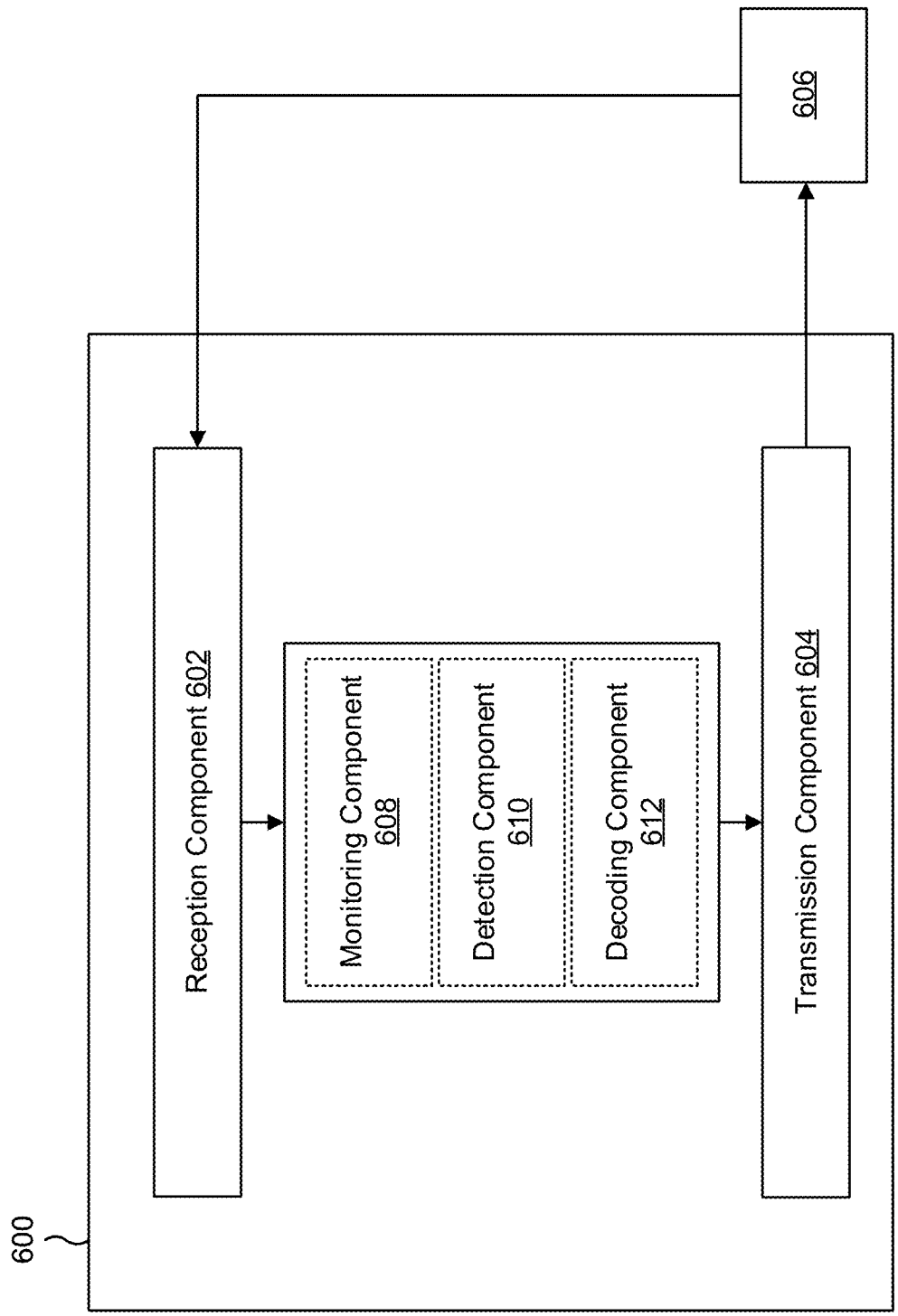
FIG. 6 is a block diagram of an example apparatus for wireless communication.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a monitoring component 608, a detection component 610, or a decoding component 612, among other examples.

In some aspects, the apparatus 600 may be configured to perform one or more operations described herein in connection with FIGS. 4A-4C. Additionally, or alternatively, the apparatus 600 may be configured to perform one or more methods described herein, such as method 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The transmission component 604 may transmit, to a base station, capability information that indicates whether the UE supports a PEI before a PO associated with the UE, wherein the capability information further indicates a minimum gap between a first message scheduling a page and a second message carrying the page. The monitoring component 608 may monitor, while in an inactive or idle state, a control channel for the first message based at least in part on the capability information.

The reception component 602 may receive the second message carrying the page based at least in part on scheduling information included in the paging DCI.

The reception component 602 may receive, from the base station, information configuring a PEI occasion before each PO associated with the UE paging group based at least in part on the minimum gap indicated in the capability information.

The detection component 610 may detect a PEI message in a PEI occasion before a PO associated with the UE paging group. The decoding component 612 may determine that at least one page is scheduled in the PO following the PEI occasion in which the PEI message is detected.

The decoding component 612 may decode the second message carrying the at least one page based at least in part on the PEI message indicating that the at least one page scheduled in the PO following the PEI occasion includes a page for one or more UEs in the UE paging group.

The decoding component 612 may refrain from decoding the second message carrying the at least one page based at least in part on the PEI message indicating that the at least one page scheduled in the PO following the PEI occasion does not include a page for any UE in the UE paging group.

The reception component 602 may receive, from the base station, configuration information indicating that the UE is either to refrain from decoding the second message or monitor the control channel for a paging indication associated with a PO following a PEI occasion in which a condition is satisfied. The monitoring component 608 and/or the decoding component 612 may operate according to the configuration information in a PO following a PEI occasion in which the condition is satisfied.

The monitoring component 608 may determine that the PEI occasion is invalid based at least in part on the PEI occasion overlapping with one or more of a downlink reference signal or an RRM measurement window.

The reception component 602 may measure one or more reference signals to enable reception of the second message based at least in part on detecting the first message on the control channel, wherein a configuration associated with the one or more reference signals is indicated in a SIB other than a MIB or a SIB that carries information to enable access to a cell provided by the base station.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
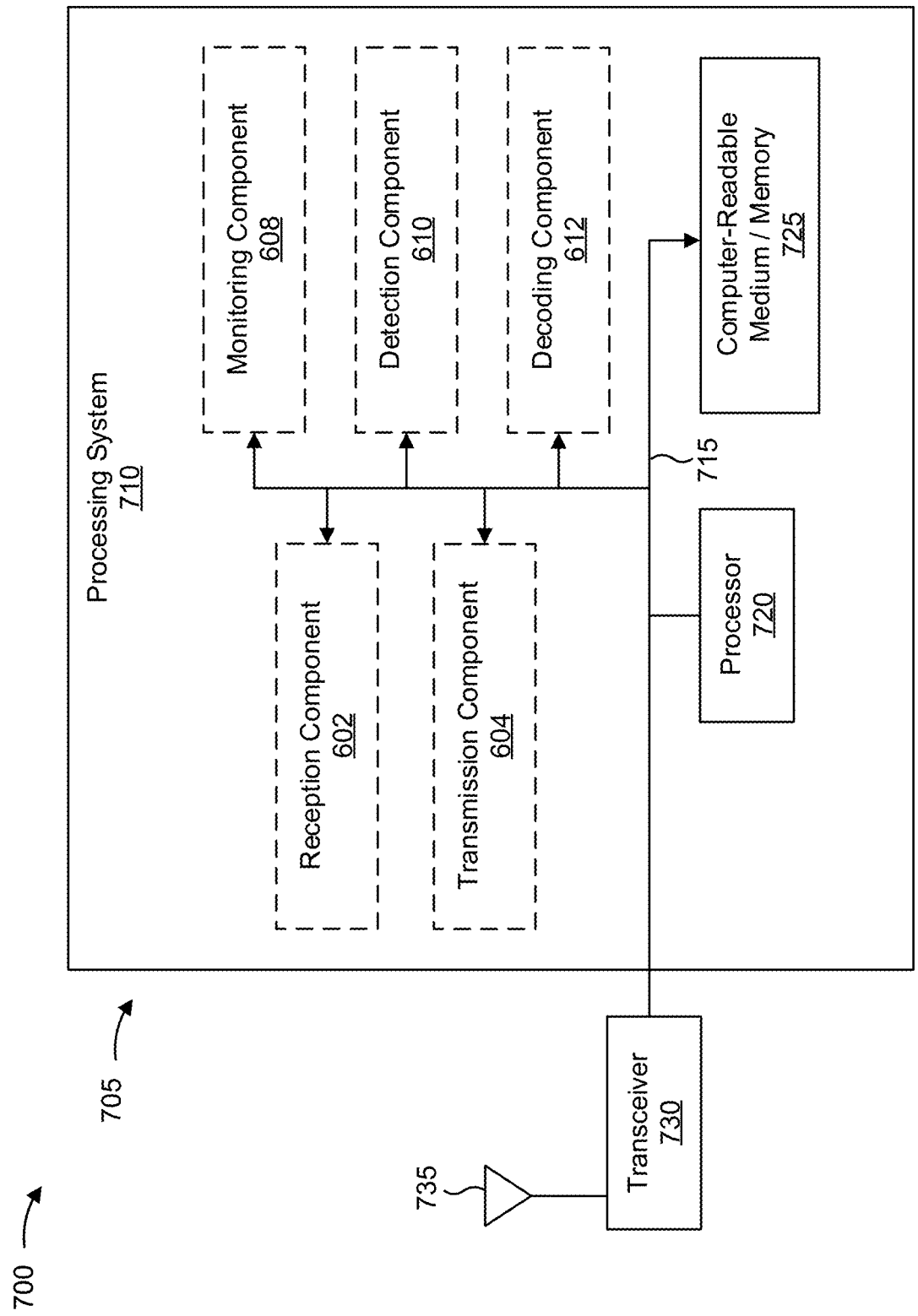
FIG. 7 is a diagram illustrating an example of a hardware implementation for an apparatus employing a processing system.

FIG. 7 is a diagram illustrating an example 700 of a hardware implementation for an apparatus 705 employing a processing system 710. The apparatus 705 may be a UE.

The processing system 710 may be implemented with a bus architecture, represented generally by the bus 715. The bus 715 may include any number of interconnecting buses and bridges depending on the specific application of the processing system 710 and the overall design constraints. The bus 715 links together various circuits including one or more processors and/or hardware components, represented by the processor 720, the illustrated components, and the computer-readable medium/memory 725. The bus 715 may also link various other circuits, such as timing sources, peripherals, voltage regulators, and/or power management circuits.

The processing system 710 may be coupled to a transceiver 730. The transceiver 730 is coupled to one or more antennas 735. The transceiver 730 provides a means for communicating with various other apparatuses over a transmission medium. The transceiver 730 receives a signal from the one or more antennas 735, extracts information from the received signal, and provides the extracted information to the processing system 710, specifically the reception component 602. In addition, the transceiver 730 receives information from the processing system 710, specifically the transmission component 604, and generates a signal to be applied to the one or more antennas 735 based at least in part on the received information.

The processing system 710 includes a processor 720 coupled to a computer-readable medium/memory 725. The processor 720 is responsible for general processing, including the execution of software stored on the computer-readable medium/memory 725. The software, when executed by the processor 720, causes the processing system 710 to perform the various functions described herein for any particular apparatus. The computer-readable medium/memory 725 may also be used for storing data that is manipulated by the processor 720 when executing software. The processing system further includes at least one of the illustrated components. The components may be software modules running in the processor 720, resident/stored in the computer-readable medium/memory 725, one or more hardware modules coupled to the processor 720, or a combination thereof.

In some aspects, the processing system 710 may be a component of the UE 120 and may include the memory 282 and/or at least one of the TX MIMO processor 266, the RX processor 258, and/or the controller/processor 280. In some aspects, the apparatus 705 for wireless communication includes means for transmitting, to a base station, capability information that indicates whether the apparatus 705 supports a PEI before a PO associated with the apparatus 705, wherein the capability information further indicates a minimum gap between a first message scheduling a page and a second message carrying the page and/or means for monitoring, while in an inactive or idle state, a control channel for the first message based at least in part on the capability information. The aforementioned means may be one or more of the aforementioned components of the apparatus 600 and/or the processing system 710 of the apparatus 705 configured to perform the functions recited by the aforementioned means. As described elsewhere herein, the processing system 710 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 7 is provided as an example. Other examples may differ from what is described in connection with FIG. 7.

The following provides an overview of some aspects of the present disclosure:

Aspect 1: A method of wireless communication performed by a UE, comprising: transmitting, to a base station, capability information that indicates whether the UE supports a PEI before a PO associated with the UE, wherein the capability information further indicates a minimum gap between a first message scheduling a page and a second message carrying the page; and monitoring, while in an inactive or idle state, a control channel for the first message based at least in part on the capability information.

Aspect 2: The method of Aspect 1, wherein the first message includes a paging DCI message based at least in part on the capability information indicating that the UE does not support the PEI before the PO associated with the UE.

Aspect 3: The method of Aspect 2, wherein the minimum gap includes a minimum k0 that indicates a minimum offset between a first slot in which the paging DCI message is received and a second slot in which the second message carrying the page is scheduled.

Aspect 4: The method of any of Aspects 2-3, further comprising: receiving the second message carrying the page based at least in part on scheduling information included in the paging DCI.

Aspect 5: The method of Aspect 4, wherein the scheduling information included in the paging DCI indicates that the second message carrying the page is scheduled in a first PO that is at least a number of slots after a PO associated with the paging DCI.

Aspect 6: The method of Aspect 5, wherein the number of slots is a maximum value among one or more minimum k0 values supported by a set of UEs that have pages scheduled in the PO associated with the paging DCI.

Aspect 7: The method of Aspect 1, wherein the first message includes a PEI message shared by a UE paging group that includes the UE based at least in part on the capability information indicating that the UE supports the PEI before the PO associated with the UE.

Aspect 8: The method of Aspect 7, wherein the PEI message is scrambled by a group-common RNTI.

Aspect 9: The method of any of Aspects 7-8, further comprising: receiving, from the base station, information configuring a PEI occasion before each PO associated with the UE paging group based at least in part on the minimum gap indicated in the capability information.

Aspect 10: The method of any of Aspects 7-9, further comprising: detecting a PEI message in a PEI occasion before a PO associated with the UE paging group; and determining that at least one page is scheduled in the PO following the PEI occasion in which the PEI message is detected.

Aspect 11: The method of Aspect 10, wherein the PEI message indicates whether the at least one page scheduled in the PO following the PEI occasion includes a page for one or more UEs in the UE paging group.

Aspect 12: The method of any of Aspects 10-11, wherein the PEI message includes scheduling information for the second message carrying the at least one page based at least in part on the PEI message indicating that the at least one page scheduled in the PO following the PEI occasion includes a page for one or more UEs in the UE paging group.

Aspect 13: The method of any of Aspects 10-12, further comprising: decoding the second message carrying the at least one page based at least in part on the PEI message indicating that the at least one page scheduled in the PO following the PEI occasion includes a page for one or more UEs in the UE paging group.

Aspect 14: The method of any of Aspects 10-12, further comprising: refraining from decoding the second message carrying the at least one page based at least in part on the PEI message indicating that the at least one page scheduled in the PO following the PEI occasion does not include a page for any UE in the UE paging group.

Aspect 15: The method of any of Aspects 7-14, further comprising: receiving, from the base station, configuration information indicating that the UE is either to refrain from decoding the second message or monitor the control channel for a paging indication associated with a PO following a PEI occasion in which a condition is satisfied; and operating according to the configuration information in a PO following a PEI occasion in which the condition is satisfied.

Aspect 16: The method of Aspect 15, wherein the condition includes one or more of a failure to detect a PEI message in the PEI occasion, a failure to decode a PEI message in the PEI occasion, or a determination that the PEI occasion is invalid.

Aspect 17: The method of Aspect 16, further comprising: determining that the PEI occasion is invalid based at least in part on the PEI occasion overlapping with one or more of a downlink reference signal or an RRM measurement window.

Aspect 18: The method of any of Aspects 1-17, further comprising: measuring one or more reference signals to enable reception of the second message based at least in part on detecting the first message on the control channel, wherein a configuration associated with the one or more reference signals is indicated in a SIB other than a MIB or a SIB that carries information to enable access to a cell provided by the base station.

Aspect 19: The method of Aspect 18, wherein the SIB indicating the configuration associated with the one or more reference signals is addressed to multiple UEs.

Aspect 20: The method of any of Aspects 18-19, wherein the first message indicates availability of the one or more reference signals based at least in part on the capability information.

Aspect 21: An apparatus for wireless communication at a device, comprising a processor; memory coupled with the processor; and instructions stored in the memory and executable by the processor to cause the apparatus to perform the method of any of Aspects 1-20.

Aspect 22: A device for wireless communication, comprising a memory and one or more processors coupled to the memory, the memory and the one or more processors configured to perform the method of any of Aspects 1-20.

Aspect 23: An apparatus for wireless communication, comprising at least one means for performing the method of any of Aspects 1-20.

Aspect 24: A non-transitory computer-readable medium storing code for wireless communication, the code comprising instructions executable by a processor to perform the method of any of Aspects 1-20.

Aspect 25: A non-transitory computer-readable medium storing a set of instructions for wireless communication, the set of instructions comprising one or more instructions that, when executed by one or more processors of a device, cause the device to perform the method of any of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
transmit, to a network entity, capability information that indicates whether the UE supports or does not support a paging early indication (PEI) before a paging occasion (PO) associated with the UE,
wherein, in a first case where the capability information indicates that the UE supports the PEI, a first message scheduling a page includes a PEI message indicating that the page is for one or more UEs in a UE group, the UE group comprising the UE, and
wherein, in a second case where the capability information indicates that the UE does not support the PEI, the first message includes a paging downlink control information (DCI) message and the capability information further indicates a minimum gap between the paging DCI message and a second message carrying the page; and
monitor, while in an inactive or idle state, a control channel for the first message based at least in part on the capability information.

2. The UE of claim 1, wherein the minimum gap includes a minimum k0 that indicates a minimum offset between a first slot in which the paging DCI message is received and a second slot in which the second message is scheduled.

3. The UE of claim 1, wherein the one or more processors are further configured to:
receive the second message based at least in part on scheduling information included in the paging DCI message.

4. The UE of claim 1, wherein the PEI message is shared by the UE group.

5. The UE of claim 1, wherein the PEI message is scrambled by a group-common radio network temporary identity.

6. The UE of claim 1, wherein the one or more processors are further configured to:
receive, from the network entity, information configuring a PEI occasion before each PO associated with the UE group.

7. The UE of claim 1, wherein the one or more processors are further configured to:
detect the PEI message in a PEI occasion before the PO; and
determine that at least one page is scheduled in the PO following the PEI occasion in which the PEI message is detected.

8. The UE of claim 7, wherein the PEI message includes scheduling information for the second message based at least in part on the PEI message indicating that the at least one page scheduled in the PO following the PEI occasion includes the page for the one or more UEs in the UE group.

9. The UE of claim 7, wherein the one or more processors are further configured to:
decode the second message based at least in part on the PEI message indicating that the at least one page scheduled in the PO following the PEI occasion includes the page for the one or more UEs in the UE group.

10. The UE of claim 7, wherein the one or more processors are further configured to:
refrain from decoding the second message based at least in part on the PEI message indicating that the at least one page scheduled in the PO following the PEI occasion does not include a page for any UE in the UE group.

11. The UE of claim 1, wherein the one or more processors are further configured to:
receive, from the network entity, configuration information indicating that the UE is either to refrain from decoding the second message or monitor the control channel for a paging indication associated with another PO following a PEI occasion in which a condition is satisfied; and
operate according to the configuration information in the other PO following the PEI occasion in which the condition is satisfied.

12. The UE of claim 11, wherein the condition includes one or more of a failure to detect a PEI message in the PEI occasion, a failure to decode a PEI message in the PEI occasion, or a determination that the PEI occasion is invalid.

13. The UE of claim 1, wherein the one or more processors are further configured to:
measure one or more reference signals to enable reception of the second message based at least in part on detecting the PEI message on the control channel, wherein a configuration associated with the one or more reference signals is indicated in a system information block (SIB) other than:
a master information block, or
a SIB that carries information to enable access to a cell provided by the network entity.

14. The UE of claim 13, wherein the SIB indicating the configuration associated with the one or more reference signals is addressed to multiple UEs.

15. The UE of claim 13, wherein the PEI message indicates availability of the one or more reference signals based at least in part on the capability information.

16. A method of wireless communication performed by a user equipment (UE), comprising:
transmitting, to a network entity, capability information that indicates whether the UE supports or does not support a paging early indication (PEI) before a paging occasion (PO) associated with the UE,
wherein, in a first case where the capability information indicates that the UE supports the PEI, a first message scheduling a page includes a PEI message indicating that the page is for one or more UEs in a UE group, the UE group comprising the UE, or
wherein, in a second case where the capability information indicates that the UE does not support the PEI, the first message includes a paging downlink control information (DCI) message and the capability information further indicates a minimum gap between the paging DCI message and a second message carrying the page; and monitoring, while in an inactive or idle state, a control channel for the first message based at least in part on the capability information.

17. The method of claim 16, wherein the minimum gap includes a minimum k0 that indicates a minimum offset between a first slot in which the paging DCI message is received and a second slot in which the second message is scheduled.

18. The method of claim 16, further comprising:
receiving the second message based at least in part on scheduling information included in the paging DCI message.

19. The method of claim 16, wherein the PEI message is shared by the UE group based at least in part on the capability information indicating that the UE supports the PEI.

20. The method of claim 19, wherein the PEI message is scrambled by a group-common radio network temporary identity.

21. The method of claim 19, further comprising:
receiving, from the network entity, information configuring a PEI occasion before each PO associated with the UE group.

22. The method of claim 19, further comprising:
detecting, based at least in part on the capability information indicating that the UE supports the PEI, the PEI message in a PEI occasion before the PO; and
determining that at least one page is scheduled in the PO following the PEI occasion in which the PEI message is detected.

23. The method of claim 22, wherein the PEI message includes scheduling information for the second message based at least in part on the PEI message indicating that the at least one page scheduled in the PO following the PEI occasion includes the page for the one or more UEs in the UE group.

24. The method of claim 22, further comprising:
decoding the second message based at least in part on the PEI message indicating that the at least one page scheduled in the PO following the PEI occasion includes the page for the one or more UEs in the UE group.

25. The method of claim 22, further comprising:
refraining from decoding the second message based at least in part on the PEI message indicating that the at least one page scheduled in the PO following the PEI occasion does not include a page for any UE in the UE group.

26. The method of claim 16, further comprising:
receiving, from the network entity, configuration information indicating that the UE is either to refrain from decoding the second message or monitor the control channel for a paging indication associated with another PO following a PEI occasion in which a condition is satisfied; and
operating according to the configuration information in the other PO following the PEI occasion in which the condition is satisfied.

27. The method of claim 26, wherein the condition includes one or more of a failure to detect a PEI message in the PEI occasion, a failure to decode a PEI message in the PEI occasion, or a determination that the PEI occasion is invalid.

28. The method of claim 16, further comprising:
measuring one or more reference signals to enable reception of the second message based at least in part on detecting the PEI message on the control channel, wherein a configuration associated with the one or more reference signals is indicated in a system information block (SIB) other than:
a master information block, or
a SIB that carries information to enable access to a cell provided by the network entity.

29. A non-transitory computer-readable medium storing a set of instructions for wireless communication, the set of instructions comprising:
one or more instructions that, when executed by one or more processors of a user equipment (UE), cause the UE to:
transmit, to a network entity, capability information that indicates whether the UE supports or does not support a paging early indication (PEI) before a paging occasion (PO) associated with the UE,
wherein, in a first case where the capability information indicates that the UE supports the PEI, a first message scheduling a page includes a PEI message indicating that the page is for one or more UEs in a UE group, the UE group comprising the UE, and
wherein, in a second case where the capability information indicates that the UE does not support the PEI, the first message includes a paging downlink control information (DCI) message and the capability information further indicates a minimum gap between the paging DCI message and a second message carrying the page; and
monitor, while in an inactive or idle state, a control channel for the first message based at least in part on the capability information.

30. An apparatus for wireless communication, comprising:
means for transmitting, to a network entity, capability information that indicates whether the apparatus supports or does not support a paging early indication (PEI) before a paging occasion (PO) associated with the apparatus,
wherein, in a first case where the capability information indicates that the apparatus supports the PEI, a first message scheduling a page includes a PEI message indicating that the page is for one or more apparatuses in an apparatus group, the apparatus group comprising the apparatus, or
wherein, in a second case where the capability information indicates that the apparatus does not support the PEI, the first message includes a paging downlink control information (DCI) message and the capability information further indicates a minimum gap between the paging DCI message and a second message carrying the page; and
means for monitoring, while in an inactive or idle state, a control channel for the first message based at least in part on the capability information.

* * * * *